United States Patent
Cui et al.

(10) Patent No.: US 11,685,672 B2
(45) Date of Patent: Jun. 27, 2023

(54) LIQUID STERILIZATION APPARATUS

(71) Applicant: EEnotech, Inc., Sunnyvale, CA (US)

(72) Inventors: Yi Cui, Stanford, CA (US); Yuanqing Li, Santa Clara, CA (US)

(73) Assignee: EnnoPure, Inc., Sunnyvale, CA (US)

( * ) Notice: Subject to any disclaimer, the term of this patent is extended or adjusted under 35 U.S.C. 154(b) by 319 days.

(21) Appl. No.: 16/431,047

(22) Filed: Jun. 4, 2019

(65) Prior Publication Data

US 2020/0385293 A1 Dec. 10, 2020

(51) Int. Cl.
*C02F 1/461* (2023.01)

(52) U.S. Cl.
CPC ...... *C02F 1/46109* (2013.01); *C02F 2001/46161* (2013.01); *C02F 2305/08* (2013.01)

(58) Field of Classification Search
CPC ......... C02F 1/46109; C02F 2305/08; C02F 2001/46161; C02F 2303/04; C02F 2201/46115; C02F 1/4672; C02F 2201/46135
See application file for complete search history.

(56) References Cited

U.S. PATENT DOCUMENTS

| | | | |
|---|---|---|---|
| 2004/0108222 A1* | 6/2004 | Gattrell | C02F 1/46109 205/758 |
| 2008/0073288 A1 | 3/2008 | Fan et al. | |
| 2011/0017610 A1 | 1/2011 | Hahn et al. | |
| 2011/0259747 A1 | 10/2011 | Cui et al. | |
| 2015/0075992 A1* | 3/2015 | Cui | C02F 1/46 204/674 |

FOREIGN PATENT DOCUMENTS

CN  107720890  2/2018

OTHER PUBLICATIONS

International Search Report and Written Opinion for PCT/US2020/035946 dated Aug. 10, 2020, 10 pages.

\* cited by examiner

*Primary Examiner* — Salil Jain

(57) ABSTRACT

An apparatus includes a conduit including an inlet to receive a liquid and an outlet to discharge the liquid. A first porous electrode, a second porous electrode, and a third porous electrode are disposed in the conduit between the inlet and the outlet. A first porous separator is interposed between the first porous electrode and the second porous electrode. A second porous separator is interposed between the second porous electrode and the third porous electrode. A power source configured to provide power to the first porous electrode, the second porous electrode, and the third porous electrode. While the liquid is flowing through the conduit, the power source supplies a first type of voltage to the first porous electrode and the third porous electrode, and supplies a second type of voltage to the second porous electrode, the second type being opposite to the first type.

18 Claims, 4 Drawing Sheets

LIQUID STERILIZATION APPARATUS

BACKGROUND

The removal of bacteria and other harmful organisms from water is an important process, not only for drinking and sanitation but also industrially as biofouling is a commonplace and serious problem. Conventional methods for water sterilization include chlorination and membrane-based approaches. Unfortunately, both of these types of approaches suffer from certain deficiencies.

Chlorination is typically a slow process, involving incubation times up to an hour or more to allow chlorine species to adequately dissipate through water to be treated. Also, chlorination can yield hazardous oxidation byproducts, including carcinogenic species, and chlorination equipment can be capital intensive, both from the standpoint of deployment and maintenance.

Conventional membrane-based approaches typically operate based on size exclusion of bacteria, which can involve a high pressure drop across a membrane and clogging of the membrane. Moreover, conventional membrane-based approaches can be energy intensive, and can suffer from low flow rates across a membrane.

SUMMARY

Described herein are an apparatus for sterilizing water or other liquid for drinking and industrial uses.

In one embodiment, the disclosure describes an apparatus that includes a conduit including an inlet to receive liquid and an outlet to discharge the liquid, and a first porous electrode, a second porous electrode, and a third porous electrode disposed in the conduit between the inlet and the outlet. A first porous separator is interposed between the first porous electrode and the second porous electrode. A second porous separator is interposed between the second porous electrode and the third porous electrode. A power source is configured to provide power to the first porous electrode, the second porous electrode, and the third porous electrode. While the liquid is flowing through the conduit, the power source supplies a first type of voltage to the first porous electrode and the third porous electrode, and supplies a second type of voltage to the second porous electrode, the second type being opposite to the first type. The power source could be direct or alternating current with any waveforms.

In some embodiments, each of the first porous electrode, the second porous electrode, and the third porous electrode includes a porous support and nanostructures coupled to the porous support.

In some instances, the porous support includes a plurality of pores and wherein the nanostructures are disposed to protrude from the porous support toward the pores or other directions. In some embodiments, the nanostructures include a nanowire and a nanotube. In some embodiments, the porous support includes a foam body. The foam body may be conductive. In some embodiments, the foam body includes a metal foam body. The metal foam body may include copper, nickel, or other suitable metals.

In some embodiments, the nanostructures include copper nanowires and/or carbon nanotubes.

In some embodiments, the first porous separator has a first thickness and the second porous separator has a second thickness. The first thickness is different from the second thickness.

In some embodiments, the apparatus further includes a third porous separator disposed on the first porous electrode and a fourth porous electrode disposed on the third porous separator. While the liquid is flowing through the conduit, the power source supplies the second type of voltage to the fourth porous electrode.

In some embodiments, the apparatus further includes a fourth porous separator disposed on the third porous electrode and a fifth porous electrode disposed on the fourth porous separator. While the liquid is flowing through the conduit, the power source supplies the second type of voltage to the fourth porous electrode.

In some embodiments, the first type of voltage is a positive voltage and the second type of voltage is a negative voltage, or the first type of voltage is the negative voltage and the second type of voltage is the positive voltage. The power source provides a direct current or an alternating current to the porous electrodes. In some embodiments, the power source provides an alternating current to the porous electrodes in sine waves or square waves. In some instances, the power source provides the alternating current to the porous electrodes at 0.5 to 10 Hz. A voltage difference between the first type of voltage and the second type of voltage is about 0 to about 40 Volts.

In some embodiments, the porous separators and the porous electrodes are hydrophilic.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION OF EMBODIMENTS

Figure 1:
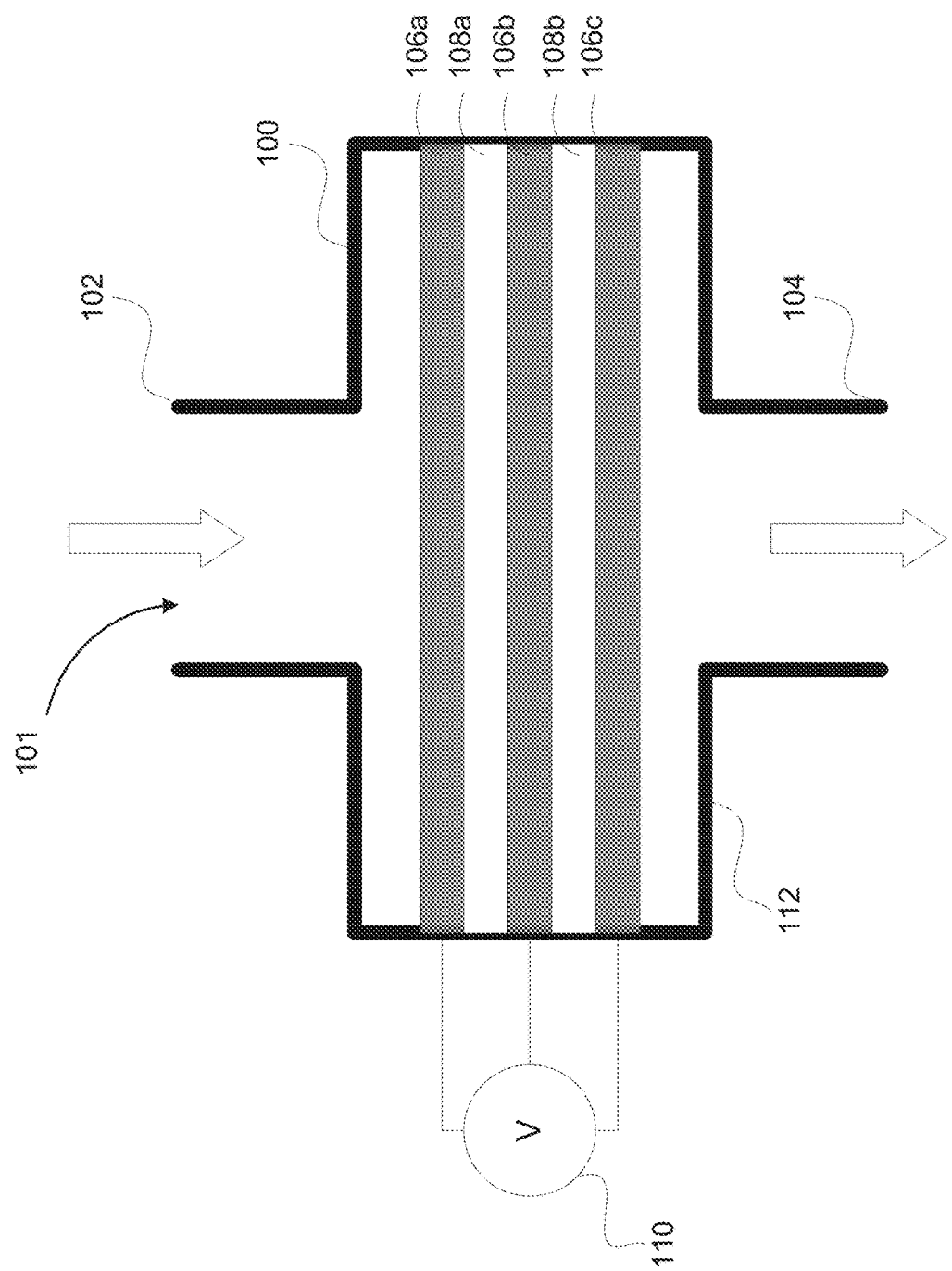
FIG. 1 is a schematic diagram depicting a liquid sterilization apparatus according to one example embodiment.

In the following description, certain specific details are set forth in order to provide a thorough understanding of various embodiments of the invention. However, one skilled in the art will understand that the invention may be practiced without these details. Moreover, while various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise.

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments.

Various embodiments described herein are directed to an apparatus for sterilizing water and other liquids for drinking and industrial uses. In one embodiment, a water-sterilizing apparatus includes a conduit including an inlet to receive a liquid and an outlet to discharge the liquid, and a first porous electrode, a second porous electrode, and a third porous electrode disposed in the conduit between the inlet and the outlet. A first porous separator is interposed between the first porous electrode and the second porous electrode. A second porous separator is interposed between the second porous electrode and the third porous electrode. A power source is configured to provide power to the first porous electrode, the second porous electrode, and the third porous electrode. While the liquid is flowing through the conduit, the power source supplies a first type of voltage to the first porous electrode and the third porous electrode, and supplies a second type of voltage to the second porous electrode, the second type being opposite to the first type.

Embodiments will now be explained with accompanying figures. Reference is first made to FIG. 1. FIG. 1 is a schematic diagram illustrating a liquid sterilization apparatus 100 according to one example embodiment. The apparatus 100 includes a conduit 101 that has an inlet 102 to receive a liquid and an outlet 104 to discharge the liquid. The apparatus 100 further includes a plurality of porous electrodes 106a-c (collectively 106) and porous separators 108a-b (collectively 108), all disposed in the conduit 101. In the illustrated embodiments, the apparatus 100 includes three porous electrodes 106a-c and two porous separators 108a-b. Each of the porous separators 108 is interposed between two adjacent porous electrodes 106. As shown in FIG. 1, the porous separator 108a is interposed between porous electrodes 106a and 106b, and the porous separator 108b is interposed between porous electrodes 106b and 106c. The porous electrodes 106 and the porous separators 108 are stacked one over another without a gap therebetween. Although three porous electrodes and two porous separators are illustrated in FIG. 1, the present disclosure is not so limited. More porous electrodes and porous separators can be disposed in the conduit 101 to form a compact and efficient liquid sterilization apparatus based on needs and its applications.

The apparatus 100 further includes a power source 110 configured to provide power to the porous electrodes 106. In one embodiment, the power source 110 supplies a first type of voltage to the porous electrodes 106a and 106c, and supplies a second type of voltage to the porous electrode 106b. The second type is opposite to the first type. For example, the first type and the second type could be positive and negative, respectively, or vice versa. In some embodiments, a voltage difference between the first type of voltage and the second type of voltage is about 0 and to about 40 Volts or about 20 and to about 40 Volts.

In some embodiments, the power source provides a direct current or an alternating current to the porous electrodes. In some embodiments, the alternating current includes sine waves or square waves. In some embodiments, a frequency of the alternating current is at 0.5 to 10 Hz or at 0.5 to 1 Hz.

The porous electrodes 106 and porous separators 108 are disposed in a case 112 of the apparatus 100. The porous separators 108 may include a porous polymer or mesh that provide insulation between two adjacent porous electrodes 106. In some embodiments, materials for the porous electrodes 106 and the porous separators 108 are selected such that they are hydrophilic or have a high permeability to water or to the liquid they are designed to sterilize. The inlet 102 and the outlet 104 may include fitting mechanisms (not shown) to connect with an upstream pipe or container and a downstream pipe or container, respectively.

Figure 2:
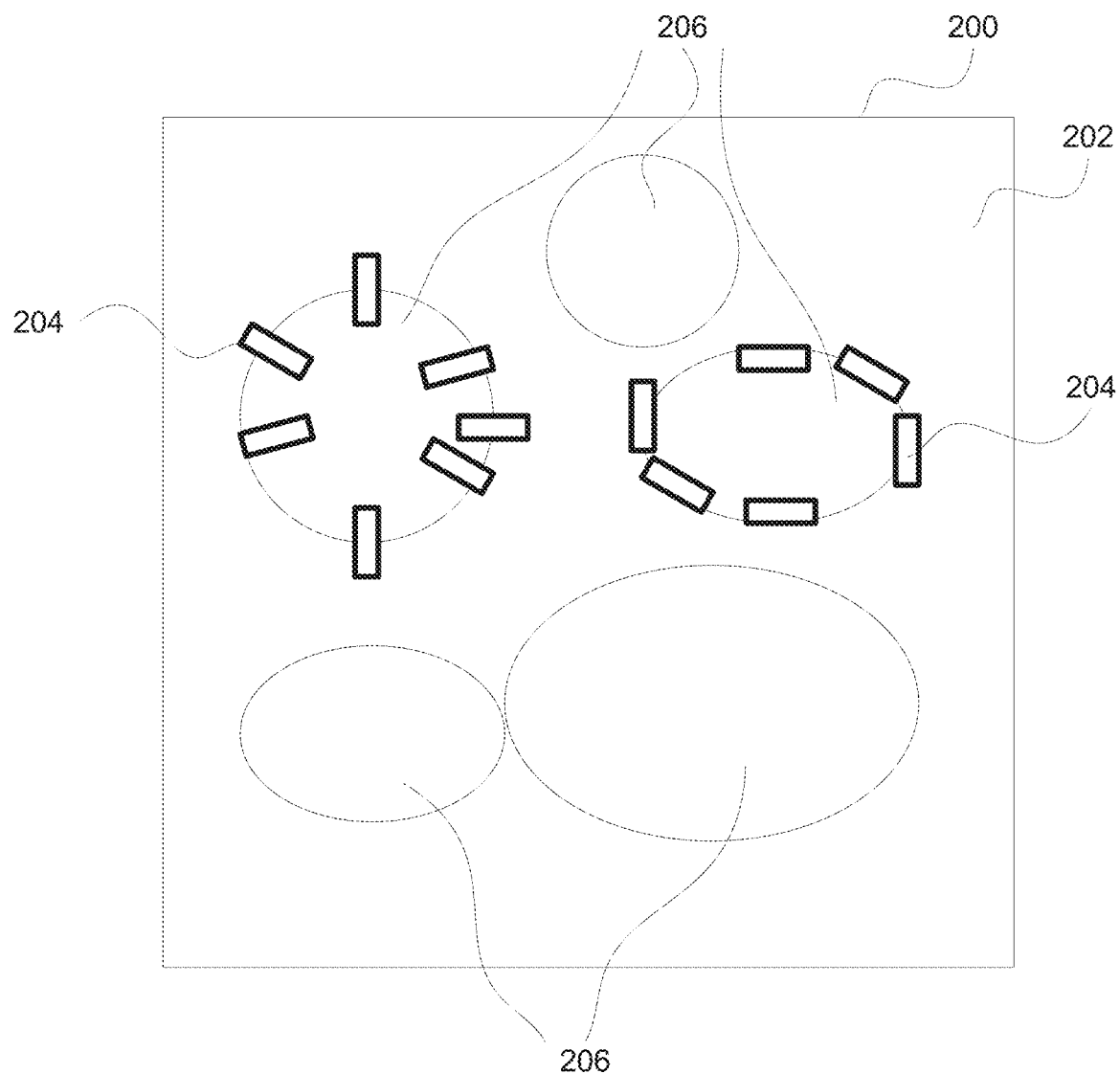
FIG. 2 is a schematic diagram depicting a portion of a porous electrode according to one example embodiment.

Each of the porous electrodes 106 includes a porous support and nanostructures coupled to the porous support. Reference is made to FIG. 2. FIG. 2 is a schematic diagram illustrating a portion of a porous electrode 200, according to one example embodiment. The porous electrodes 200 includes a porous support 202 and a plurality of nanostructures 204 coupled with the porous support 202. In one embodiment, the porous support 202 may include a foam body and pores 206 embedded in the foam body 206.

A porous support can also be formed of a material that is insulating, electrically conductive, or semiconducting, or can be formed of a combination of materials having a combination of characteristics. For example, the porous support 202 may include a copper foam body. In some embodiments, the porous support 202 may include a fibrous material including a matrix or a network of fibers that can be woven or unwoven. Examples of fibrous materials include paper and textiles and felt, including those formed of natural fibers, such as cotton, flax, and hemp, and those formed of synthetic fibers, such as acrylic, polyester, rayon, as well as carbon fiber in the form of a carbon cloth. Other types of porous supports are contemplated, such as permeable or semi-permeable membranes, sponges, and meshes formed of metals or other electrically conductive materials.

A pore size of the porous support 202 can be selected based on a typical size of organisms to be inactivated. For example, in the case of bacteria, a pore size can be selected to be greater than a typical size of bacteria to be inactivated, thereby allowing passage of bacteria with little or no clogging of a porous support. In some embodiments, the porous support 202 can include pores 206 that are sufficiently sized in the micrometer range, such as at least about 5 μm or at least about 10 μm and up to about 1 mm. In some instances, a pore size can be in the range of about 5 μm to about 900 μm, about 10 μm to about 800 μm, about 10 μm to about 700 μm, about 10 μm to about 600 μm, about 10 μm to about 500 μm, about 20 μm to about 400 μm, about 30 μm to about 300 μm, about 40 μm to about 300 μm, about 50 μm to about 300 μm, or about 50 μm to about 200 μm. In the case of other types of organisms, a pore size can be suitably selected in accordance with a typical size of those organisms. For example, in the case of viruses, a pore size can be selected to be in the nanometer range, such as at least about 100 nm and up to about 1 μm. As can be appreciated, pores of a porous support can have a distribution of sizes, and a pore size can refer to an effective size across the distribution of sizes or an average or median of the distribution of sizes.

The porous support 202 may be characterized by its porosity, which is a measure of the extent of voids resulting from the presence of pores or any other open spaces in the porous support. A porosity can be represented as a ratio of a volume of voids relative to a total volume, namely between 0 and 1, or as a percentage between 0% and 100%. In some embodiments, a porous support can have a porosity that is at least about 0.05 or at least about 0.1 and up to about 0.95, and, more particularly, a porosity can be in the range of about 0.1 to about 0.9, about 0.2 to about 0.9, about 0.3 to about 0.9, about 0.4 to about 0.9, about 0.5 to about 0.9, about 0.5 to about 0.8, or about 0.6 to about 0.8. Techniques for determining porosity include, for example, porosimetry and optical or scanning techniques.

The nanostructures 204 may include a nanowire, a nanotube, or multiple or a combination of these structures. The nanostructures 204 may be characterized in terms of their material composition, shape, and size. A nanostructure can be formed of a material that is insulating, electrically conductive, or semiconducting, or can be a heterostructure formed of a combination of materials having a combination of characteristics, such as in a core-shell or multi-layered configuration. Techniques for forming nanostructures include, for example, attrition, spray pyrolysis, hot injection, laser ablation, and solution-based synthesis.

In the illustrated embodiments, the porous electrode 200 provides sterilization via an electrical mechanism, with a high surface area of the porous support 202 and nanostructures 204 along with an induced electric field in the vicinity of the nanostructures providing effective bacterial inactivation. In the case that the porous support 202 is insulating, at least a subset of the nanostructures 204 can be electrically conductive or semiconducting to impart electrical conductivity to the porous electrode 200. For example, a nanostructure can be formed of a metal, a metal alloy, a metal silicide, a metal oxide, a semiconductor, an electrically conductive polymer, a doped form of such materials, or a combination of such materials. In some instances, a nanostructure can be formed of copper, gold, nickel, palladium, platinum, silver, carbon (e.g., in the form of a graphene) or another Group IVB element (e.g., silicon or germanium), a Group IVB-IVB binary alloy (e.g., silicon carbide), a Group IIB-VIB binary alloy (e.g., zinc oxide), a Group IIIB-VB binary alloy (e.g., aluminum nitride), or another binary, ternary, quaternary, or higher order alloy of Group IB (or Group 11) elements, Group IIB (or Group 12) elements, Group IIIB (or Group 13) elements, Group IVB (or Group 14) elements, Group VB (or Group 15) elements, Group VIB (or Group 16) elements, and Group VIIB (or Group 17) elements.

The nanostructures 204 can have any of a variety of shapes, such as spheroidal, tetrahedral, tripodal, disk-shaped, pyramid-shaped, box-shaped, cube-shaped, cylindrical, tubular, and a number of other geometric and non-geometric shapes. Examples of nanostructures include fullerenes, copper nanowires, nickel nanowires, silver nanowires, germanium nanowires, silicon nanowires, carbon nanotubes (e.g., single-walled carbon nanotubes and multi-walled carbon nanotubes), and core-shell nanowires (e.g., a shell formed of copper, nickel, or silver surrounding a core formed of another material). In some embodiments, at least a subset of incorporated nanostructures corresponds to high aspect ratio nanostructures, such as nanotubes, nanowires, or a combination of nanotubes and nanowires. High aspect ratio nanostructures can have large surface areas for stronger and direct coupling to constituent fibers of a porous support, without requiring chemical strategies to provide such coupling. High aspect ratio nanostructures also increase the occurrence of junction formation between neighboring nanostructures, and can form an efficient charge transport network by reducing the number of hopping or tunneling events, relative to the use of nanoparticles. However, it is contemplated that nanoparticles can be used in combination with, or in place of, high aspect ratio nanostructures.

In some embodiments, nanowires in the nanostructures 204 have an average or median diameter in the range of about 1 nm to about 200 nm, about 1 nm to about 150 nm, about 10 nm to about 100 nm, about 20 nm to about 100 nm, about 30 nm to about 100 nm, or about 40 nm to about 100 nm, an average or median length in the range of about 500 nm to about 100 about 800 nm to about 50 nm, about 1 μm to about 40 μm, about 1 μm to about 1 μm to about 20 μm, or about 1 μm to about 10 μm, and an average or median aspect ratio in the range of about 5 to about 2,000, about 50 to about 1,000, about 100 to about 900, about 100 to about 800, about 100 to about 700, about 100 to about 600, or about 100 to about 500.

In some embodiments, nanotubes in the nanostructures 204 have an average or median diameter (e.g., outer diameter) in the range of about 1 nm to about 200 nm, about 1 nm to about 150 nm, about 10 nm to about 100 nm, about 20 nm to about 100 nm, about 30 nm to about 100 nm, or about 40 nm to about 100 nm, an average or median length in the range of about 500 nm to about 100 about 800 nm to about 50 m, about 1 μm to about about 1 μm to 30 μm, about 1 μm to about 20 μm, or about 1 μm to about 10 μm, and an average or median aspect ratio in the range of about 5 to about 2,000, about 50 to about 1,000, about 100 to about 900, about 100 to about 800, about 100 to about 700, about 100 to about 600, or about 100 to about 500.

The porous electrodes 200 have a sheet resistance that is no greater than about 1,000 Ω/sq, no greater than about 500 Ω/sq, no greater than about 400 Ω/sq, no greater than about 300 Ω/sq, no greater than about 200 Ω/sq, no greater than about 100 Ω/sq, no greater than about 50 Ω/sq, no greater than about 25 Ω/sq, or no greater than about 10 Ω/sq, and down to about 1 Ω/sq, down to about 0.1 Ω/sq, or less.

In some embodiments, the nanostructures 204 may be coupled with the porous support 202 such that the nanostructures 204 protrude from the porous support 202 toward the pores 206, e.g., nanostructures 204 on the left pore 206 in FIG. 2. The axes of these nanostructures 204 are substantially perpendicular to the surface of the pore 206. In some embodiments, the nanostructures 204 are disposed to lie around a corresponding pore 206, e.g., nanostructures 204 on the right pore 206 in FIG. 2. The axes of these nanostructures 204 are substantially parallel to the surface of the pore 206. Nanostructures for other pores in FIG. 2 are omitted. Other types of coupling structures are contemplated. For example, nanostructures 204 may be randomly entangled with respect to the surface of the pores 206.

Incorporating the nanostructures 204 in the porous support 202 can be carried out in a variety of ways. For example, the nanostructures 204 can be formed and then dispersed in an aqueous solution or a non-aqueous solution to form an ink. Surfactants, dispersants, and other additives to adjust rheology also can be included. The ink including the dispersed nanostructures 204 can be applied to the porous support 202 using any of a number of coating techniques, such as spraying, printing, roll coating, curtain coating, gravure coating, slot-die, cup coating, blade coating, immersion, dip coating, and pipetting, followed by drying or other removal of the solution. It is also contemplated that the nanostructures 204 can be formed in situ on the porous support 202, such as by exposing surfaces of the porous support 202 to a precursor solution.

Coupling between the nanostructures 204 and the porous support 202 can rely on mechanical entanglement of the nanostructures within the pores 206 of the porous support 202, adhesion characteristics of an ink relative to constituent fibers or foams of the porous support 202, surface charges of the constituent fibers or foams, functional groups of the constituent fibers or foams, or a combination of these mechanisms. In some embodiments, coupling between the nanostructures 204 and the porous support 202 can involve the formation of chemical bonds, including covalent bonds and non-covalent bonds, such as van der Waals interactions, hydrogen bonds, bonds based on hydrophobic forces, bonds based on π-π interactions, and bonds based on electrostatic interactions (e.g., between cations and anions or dipole-dipole interactions).

Figure 3:
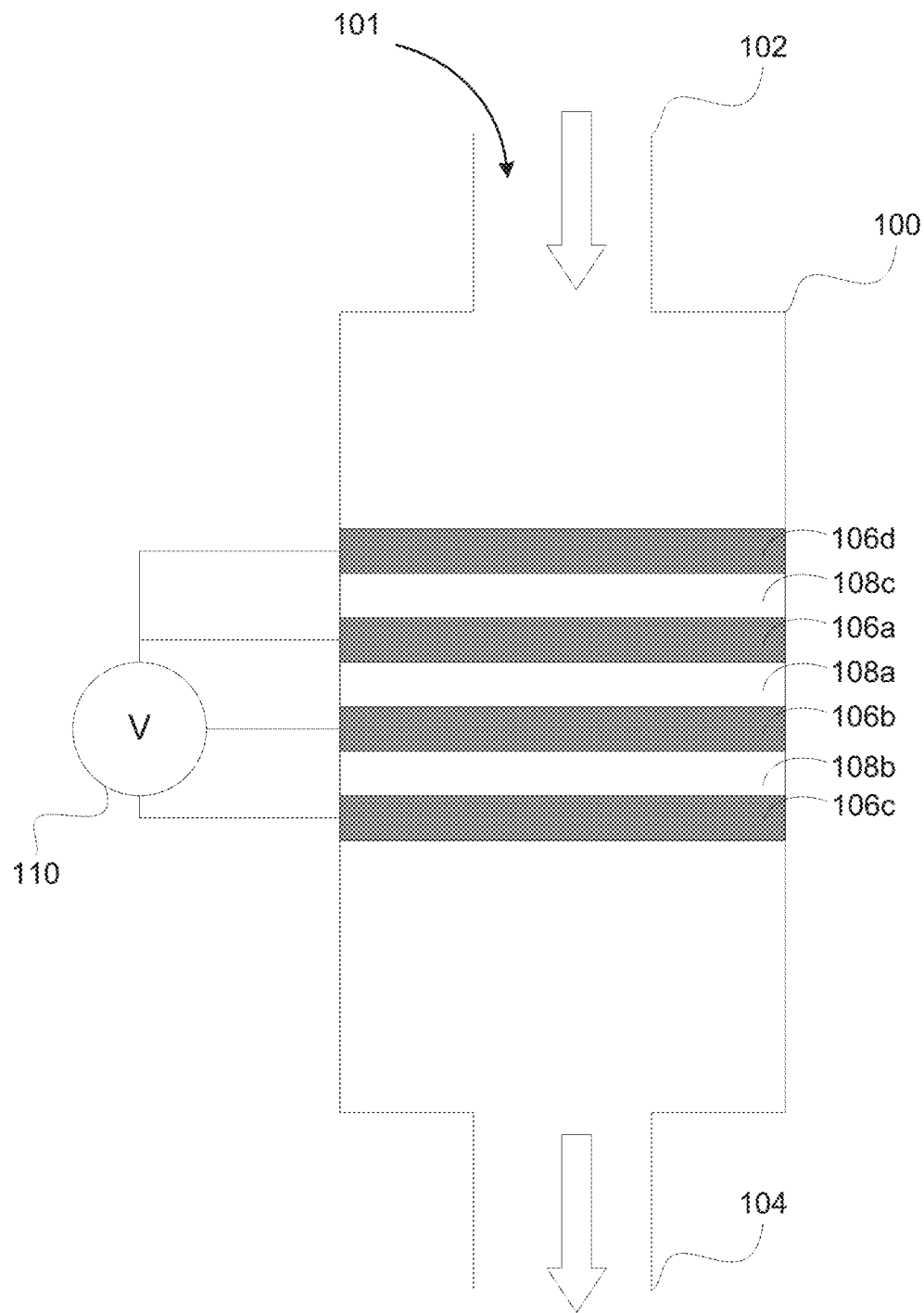
FIG. 3 is a schematic diagram depicting another liquid sterilization apparatus according to one example embodiment.

FIG. 3 is a schematic diagram illustrating another liquid sterilization apparatus 300 according to one example embodiment. The apparatus 300 is similar to the apparatus 100 in FIG. 1 and includes a further porous separator 108c disposed on the porous electrode 106a and a further porous electrode 106d disposed on the porous separator 108c. While the liquid is flowing through the conduit 101, the power source 110 supplies the porous electrodes 106a and 106c with the first type of voltage, and supplies the porous electrodes 106b and 106d with the second type of voltage, or vice versa, or with alternating voltages.

Figure 4:
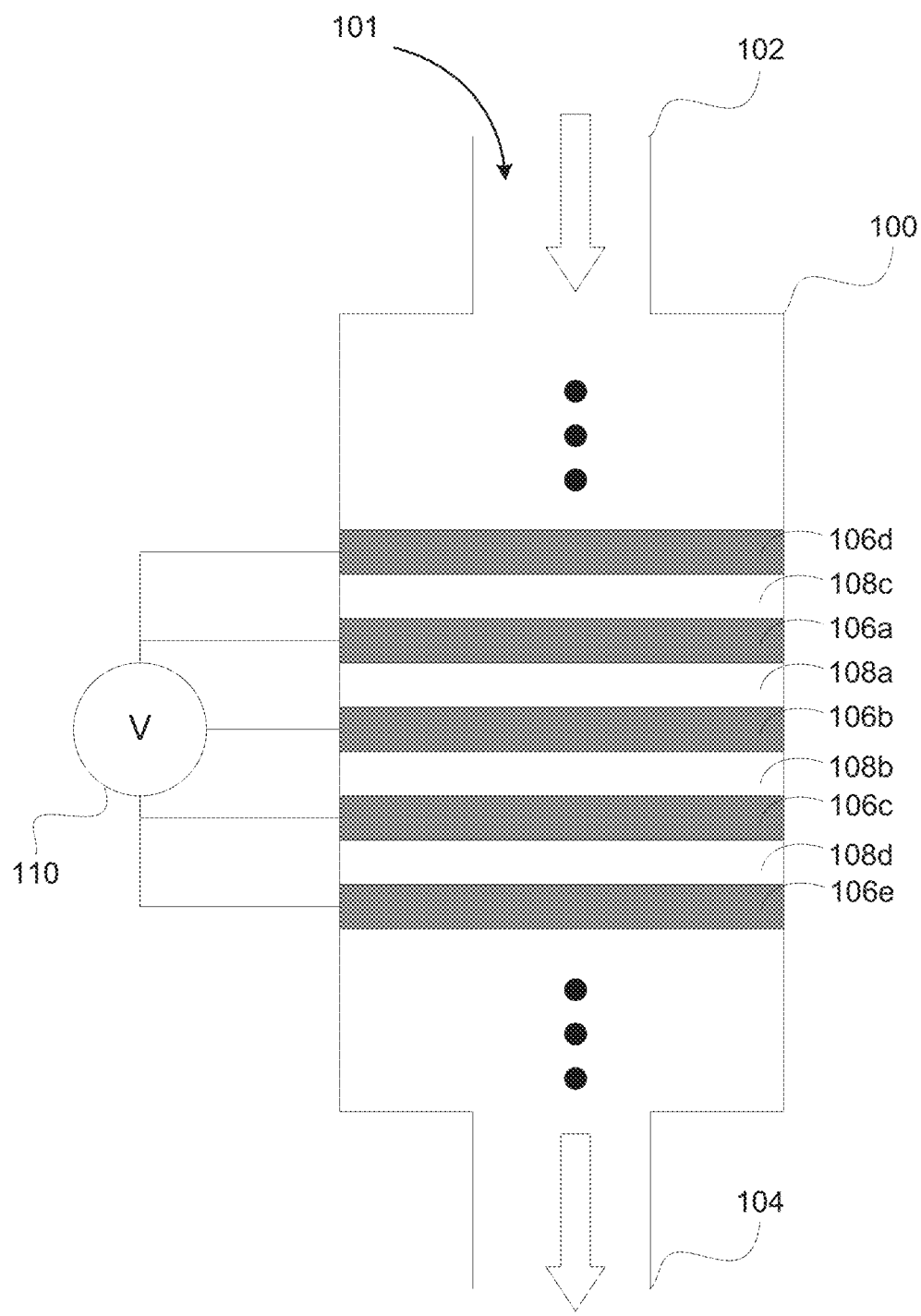
FIG. 4 is a schematic diagram depicting a liquid sterilization apparatus according to one example embodiment.

FIG. 4 is a schematic diagram illustrating another liquid sterilization apparatus 400 according to one example embodiment. The apparatus 400 is similar to the apparatus 300 in FIG. 3 and includes a further porous separator 108d disposed on the porous electrode 106c and a further porous electrode 106e disposed on the porous separator 108d. While the liquid is flowing through the conduit 101, the power source 110 supplies the porous electrodes 106a and 106c with the first type of voltage, and supplies the porous electrodes 106b, 106d, and 106e with the second type of voltage, or vice versa, or with alternating voltages. Operation of apparatuses 300 and 400 provides an improved efficiency to inactivate bacteria or other undesired organisms. In some embodiments, the apparatus 400 may be provided with more porous separators and porous electrodes on the porous electrodes 106d and 106e to further improve the bacteria inactivation efficiency.

In some embodiments, the bacterial, virus and protozoa (cysts) inactivation efficiency of the apparatuses 100, 300, and 400 is at least about 95%, or at least about 98%, and up to about 99%, up to about 99.5%, up to about 99.9%, up to 99.99%, up to 99.999% or up to 99.9999%. Such inactivation efficiency can be achieved with a short incubation time, such as in the range of about 0.1 sec to about 1 min, about 0.1 sec to about 50 sec, about 0.5 sec to about 40 sec, about 0.5 sec to about 30 sec, about 0.5 sec to about 20 sec, about 0.5 sec to about 10 sec, or about 0.5 sec to about 5 sec.

The foregoing description of the present invention has been provided for the purposes of illustration and description. It is not intended to be exhaustive or to limit the invention to the precise forms disclosed. The breadth and scope of the present invention should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. An apparatus comprising:
   a conduit including an inlet to receive a liquid and an outlet to discharge the liquid;
   a first porous electrode, a second porous electrode, and a third porous electrode disposed in the conduit between the inlet and the outlet;
   a first porous separator interposed between the first porous electrode and the second porous electrode;
   a second porous separator interposed between the second porous electrode and the third porous electrode; and
   a power source configured to provide power to the first porous electrode, the second porous electrode, and the third porous electrode,
   wherein while the liquid is flowing through the conduit, the power source supplies a first polarity of voltage to the first porous electrode and the third porous electrode, and supplies a second polarity of voltage to the second porous electrode, the second polarity being opposite to the first polarity,
   wherein each of the first porous electrode, the second porous electrode, and the third porous electrode includes a porous support having a plurality of pores and first nanostructures disposed on a surface of the porous support around the pores, wherein the first nanostructures include nanowires and/or nanotubes, and axes of the nanowires and/or nanotubes are substantially parallel to the surface of the porous support,
   wherein the power source provides a voltage difference of about 20 Volts to about 40 Volts between the first polarity of voltage and the second polarity of voltage, and
   wherein a bacterial, virus and protozoa inactivation efficiency of the apparatus is at least about 95% and up to 99.999%.

2. The apparatus according to claim 1, wherein each of the first porous electrode, the second porous electrode, and the third porous electrode further includes second nanostructures disposed on the surface of the porous support wherein the second nanostructures are disposed to protrude from the surface of the porous support and extend into the pores.

3. The apparatus according to claim 2, wherein the nanowires or the nanotubes have average diameter of 10-200 nm and average length of 500 nm to 100 μm.

4. The apparatus according to claim 1, wherein the porous support includes a foam body, a sponge, a mesh, or a fibrous structure.

5. The apparatus according to claim 4, wherein the porous support is conductive.

6. The apparatus according to claim 5, wherein the porous support includes a copper foam body.

7. The apparatus according to claim 2, wherein the first or second nanostructures include copper nanowires.

8. The apparatus according to claim 2, wherein the first or second nanostructures include carbon nanotubes.

9. The apparatus according to claim 1, wherein the first porous separator has a first thickness and the second porous separator has a second thickness, wherein the first thickness is different from the second thickness.

10. The apparatus according to claim 1, further comprising:
   a third porous separator disposed on the first porous electrode; and
   a fourth porous electrode disposed on the third porous separator, wherein while the liquid is flowing through the conduit, the power source supplies the second polarity of voltage to the fourth porous electrode.

11. The apparatus according to claim 10, further comprising:
 a fourth porous separator disposed on the third porous electrode; and
 a fifth porous electrode disposed on the fourth porous separator,
 wherein while the liquid is flowing through the conduit, the power source supplies the second polarity of voltage to the fourth porous electrode.

12. The apparatus according to claim 1, wherein the first polarity of voltage is a positive voltage and the second polarity of voltage is a negative voltage, or the first polarity of voltage is the negative voltage and the second polarity of voltage is the positive voltage, or the first polarity of voltage is opposite to the second polarity of voltage in an alternating current power source.

13. The apparatus according to claim 1, wherein the power source provides a direct current or an alternating current to the porous electrodes.

14. The apparatus according to claim 1, wherein the power source provides an alternating current to the porous electrodes in sine waves or square waves.

15. The apparatus according to claim 14, wherein the power source provides the alternating current to the porous electrodes at 0.5 to 10 Hz.

16. The apparatus according to claim 1, wherein the porous separators include a porous polymer or polymer mesh.

17. The apparatus according to claim 1, wherein the porous separators are hydrophilic.

18. The apparatus according to claim 1, wherein the porous electrodes are hydrophilic.

* * * * *